Jan. 14, 1958

J H. HUNT 2,819,929

HUB CAP STRUCTURE

Filed June 3, 1954

INVENTOR.
J HAROLD HUNT
BY
Barnes, Kisselle, Laughlin & Raisch
ATTORNEYS

Jan. 14, 1958  J H. HUNT  2,819,929
HUB CAP STRUCTURE

Filed June 3, 1954  3 Sheets-Sheet 2

INVENTOR.
J HAROLD HUNT
BY
Barnes, Kisselle, Laughlin & Raisch
ATTORNEYS.

Jan. 14, 1958  J H. HUNT  2,819,929
HUB CAP STRUCTURE

Filed June 3, 1954  3 Sheets-Sheet 3

INVENTOR.
J HAROLD HUNT
BY
ATTORNEYS.

United States Patent Office 2,819,929
Patented Jan. 14, 1958

2,819,929

HUB CAP STRUCTURE

J Harold Hunt, Lansing, Mich., assignor to Motor Wheel Corporation, Lansing, Mich., a corporation of Michigan Application June 3, 1954, Serial No. 434,205

6 Claims. (Cl. 301—108)

This invention relates to hub cap attaching means for securing hub caps on automotive vehicle wheels.

It has been usual practice heretofore to secure hub caps to the body of an automotive vehicle wheel, which has necessitated providing the wheel with special conformations or spring clips or both for engaging the hub cap. An object of this invention is to produce a simple inexpensive hub cap fastener structure for attaching the hub cap to the wheel bolts, thereby eliminating the necessity for special attachment features on the wheel and reducing the cost of wheel manufacture. One form of the invention is shown in the accompanying drawings.

Figure 2:
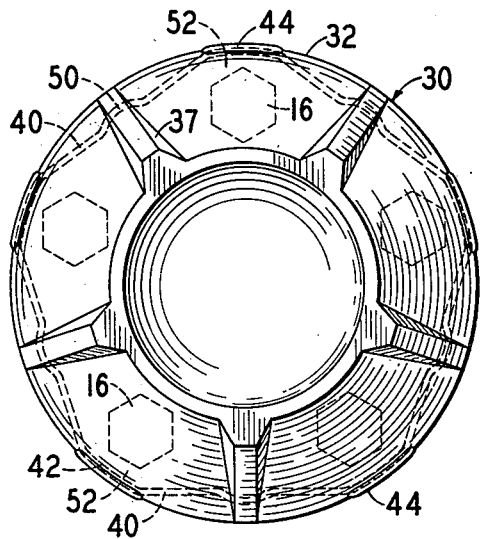
Fig. 2 is similar to Fig. 1 but showing the hub cap rotated out of engagement with the wheel bolts.

Shown in the drawings is a fragment of a stamped metal wheel generally designated 10. The wheel body 18 is provided with a central, apertured bolting-on flange 12 secured to a wheel hub 14 by bolts 16. The brake drum back is designated 20. Hub 14 has an axial extension 22 which carries a bearing race 24 for receiving an axle and a cap 26 for excluding dirt from the bearing.

Figure 4:
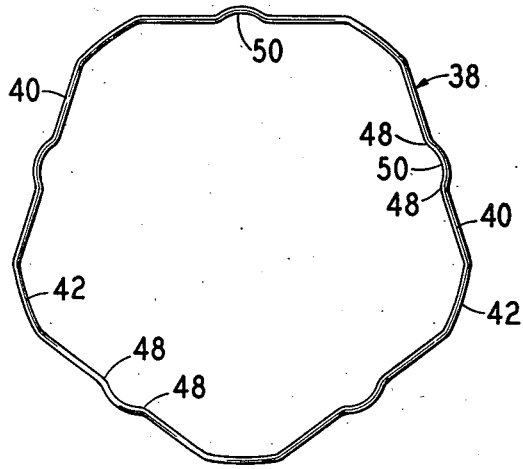
Fig. 4 is a front elevation of the wire attachment loop separate from the body of the hub cap.
Figure 5:
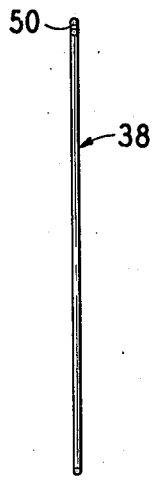
Fig. 5 is a side elevation of the attachment loop.
Figure 10:
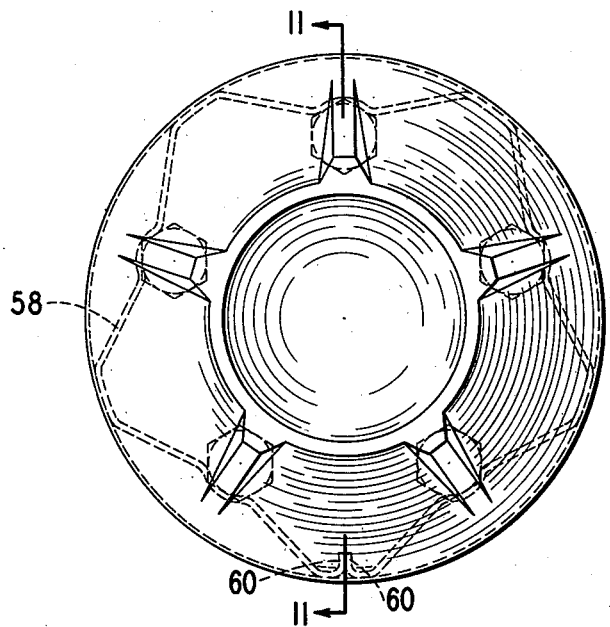
Fig. 10 is similar to Fig. 1 but showing a further modified form of hub cap attaching means.
Figure 11:
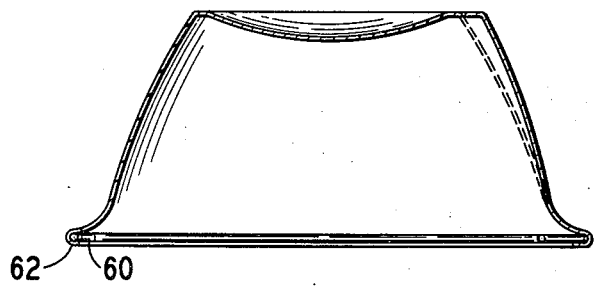
Fig. 11 is a sectional view on line 11—11 of Fig. 10.

Hub cap 30 comprises a hollow body or cup 32 (preferably a metal stamping) with a closed bottom 34 and preferably having ornamental configurations in the form of axial ribs 37. The circumferential annular rim 36 of the hub cap is adapted to fit against the wheel body when the hub cap is centered on the wheel. A plurality of wire elements 40 are mounted, and arranged circumferentially, within cap 32 in chordal relation with the inner face of the cap. Each cap is provided with at least three of these wire elements 40 for coaction with the bolts 16. These wire elements 40 may be separate elements or may be integrally joined in the form of a polygonal wire loop 38 which is secured within body 32 adjacent open end 36 preferably by soldering or crimping corners 42 to cap 32 as at 44. Crimping of the cap forms recesses in which corners 42 seat. As shown in the drawings, the circumferentially opposite ends of each recess comprise shoulders against which the ends of corner portions 42 engage to secure loop 38 non-rotatably to body 32. Loop 38 is preferably but not necessarily a closed wire loop. When wire elements 40 are integrally joined they take the form of a closed wire loop 38. However, the loop may be made of cold drawn spring wire formed in the shape shown in Fig. 4 but with the abutting ends 60 of the wire turned radially inwardly and held in abutting relation (Fig. 10) by crimping a portion of the circumferential edge of the cap over the ends of the wire as at 62 (Fig. 11).

Figure 3:
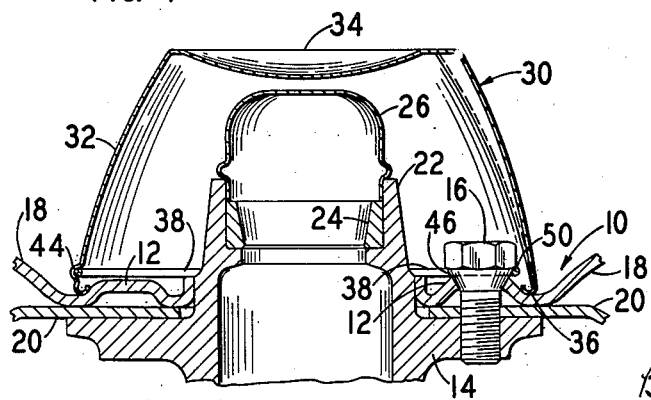
Fig. 3 is a sectional view on line 3—3 of Fig. 1 and showing portions of the wheel.
Figure 6:
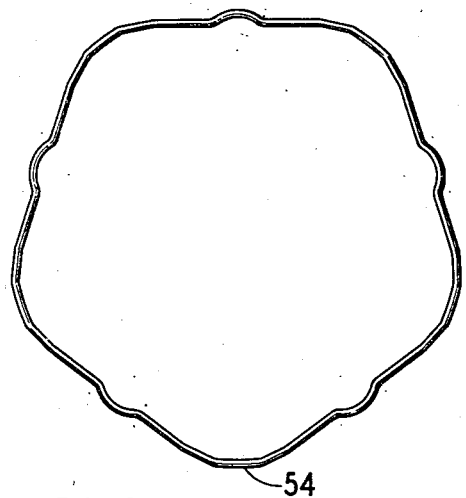
Fig. 6 is a front elevation of a modified form of wire attachment loop separate from the body of a hub cap.
Figure 7:
Fig. 7 is a side elevation of the attachment loop shown in Fig. 6.
Figure 8:
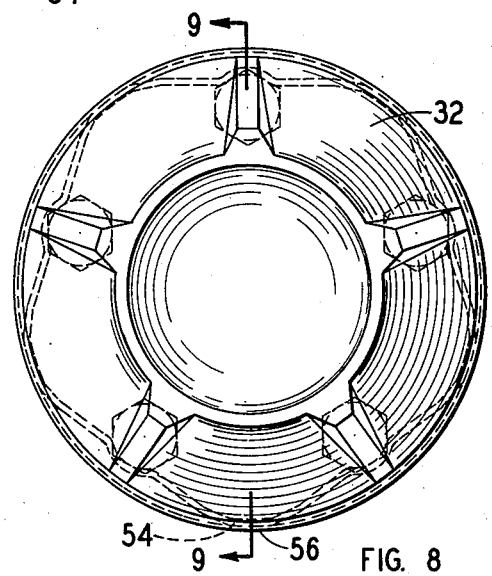
Fig. 8 is similar to Fig. 1 but showing a modified form of hub cap utilizing the attachment loop of Fig. 6.
Figure 9:
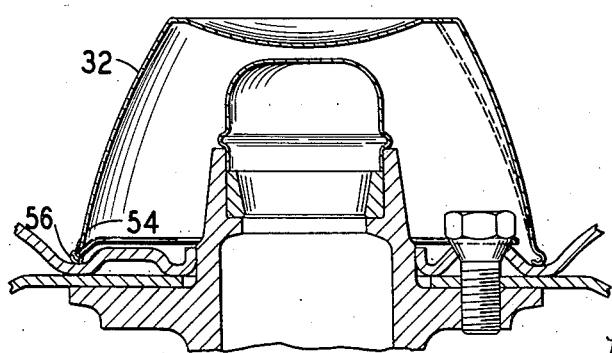
Fig. 9 is a sectional view on line 9—9 of Fig. 8.

Loop 38 preferably has one side 40 for each bolt 16 on wheel 10 and is formed of resilient wire dimensioned for seating on or against the conical head portion 46 of bolt 16 lying axially outward of bolting-on flange 12 (Fig. 3). Sides 40 lie generally in chordal relation to the periphery 36 of cap 30. Corners 42 of loop 38 lie radially outwardly of the outer radial extremities of bolts 16 but central portions 48 of sides 40, including bights 50 therein, lie slightly radially inward of the outer portions of tapered bolt heads 46, that is, a circle passing through, and determined by, corners 42 has a greater radius than a circle circumscribing bolt heads 16 (see clearance 52, Fig. 2) whereas a circle passing through bights 50 has a smaller radius than a circle circumscribing bolts 16.

Figure 1:
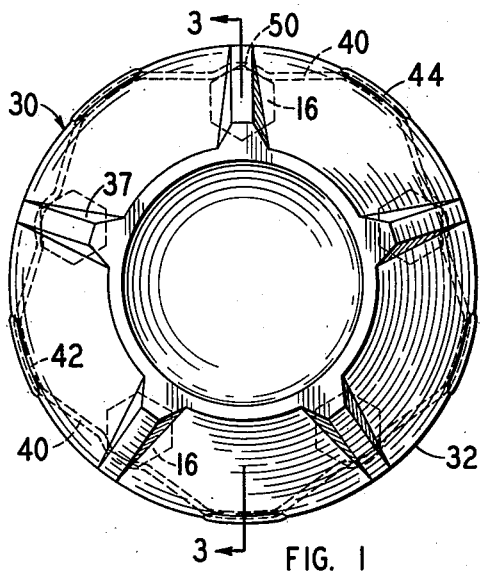
Fig. 1 is an elevational view of a hub cap provided with the attaching means which is the subject of this invention.

To secure hub cap 30 on wheel 10 rim 36 is fitted against wheel body 18 with corners 42 of the wire loop generally in radial alignment with bolts 16 as illustrated in Fig. 2. The hub cap is then rotated to bring central portions 48 of sides 40 into engagement with conical seats 46. Upon continued rotation of the hub cap, chord portions 48 are forced or sprung outwardly and bight portions or bulges 50 snap into engagement with seats or conical bolt heads 46 to secure the hub cap on the wheel (Figs. 1 and 3).

In this positoin of the hub cap, sides 40 are stressed outwardly and the grip of bights 50 on axially tapered seats 46 secures rim 36 firmly against the wheel body and holds and secures the hub cap fast against forces acting both radially and circumferentially of the wheel. The hub cap is effectively locked in position since it cannot be removed from the wheel without applying considerable force to rotate loop 38 over, and out of contact with, seats 46.

To remove the hub cap from wheel 10, cap 32 is rotated to force portions 48 over seats 46 and bring corners 42 into radial alignment with bolts 16 as shown in Fig. 2. Since corners 42 lie outwardly of the outer extremities of bolts 16, the hub cap may be freely removed from the wheel.

Ornamental projections 37 provide hand holds for applying the force or torque necessary to mount and remove the hub cap from the wheel.

The modified form of the invention shown in Figs. 6 through 9 is similar to the Fig. 1 form except that the corners of the wire loop are bent downwardly or axially inwardly as shown at 54 so that the corner portions may be crimped within the rim or circumferential edge of the hub cap as shown at 56. This structure better adapts the hub cap to certain wheel forms.

I claim:

1. In a vehicle wheel structure wherein the wheel is secured to a hub by a plurality of headed fastener elements, a hub cap comprising, a hollow body having an open side adapted to fit over the center of the wheel, said body having adjacent its open side a plurality of separate circumferentially arranged recesses, the circumferentially opposite sides of said recesses forming shoulders, means forming a polygonal wire loop having side portions and corner portions, said loop being mounted within said body with said corner portions seating directly within said recesses, each of said corner portions engaging against both of the shoulders defining the recess in which it is seated, so that said wire loop and body are secured together in non-rotatable relation, said side portions forming circumferentially spaced wire grips disposed in cordal relation to the interior of the body, said grips being radially resiliently yieldable, said grips having central portions formed with bights positioned slightly radially inwardly of the headed fastener elements when said body is centered on the wheel, said corner portions extending radially outwardly of said fasteners when said body is centered on the wheel, so that said bights engage said fasteners in a snap over action by rotating said body relatively to the wheel to facilitate removably securing said hub cap thereon.

2. The combination defined in claim 1 wherein said means forming said wire loop comprises a unitary continuous closed wire member lying substantially in a single plane.

3. The combination defined in claim 1 wherein said side portions of said wire loop lie generally in one plane and said corner portions of said loop are formed axially inwardly of said side portions.

4. The combination defined in claim 1 wherein portions of said body defining said recesses are crimped over axially opposite sides of said corner portions.

5. The combination defined in claim 1 wherein said wire loop comprises a unitary continuous piece of wire with abutting ends turned radially inwardly at one of said corner portions, a portion of said body defining a recess being crimped axially over said ends to hold them in abutting relation.

6. The combination defined in claim 1 wherein said body has a plurality of radially extending projections forming hand holds to facilitate manual attachment of said hub cap to a wheel and removal therefrom.

References Cited in the file of this patent

UNITED STATES PATENTS

| | | |
|---|---|---|
| 1,426,721 | Erik | Aug. 22, 1922 |
| 1,817,194 | Hunt | Aug. 4, 1931 |
| 2,143,456 | Sinclair | Jan. 10, 1939 |
| 2,167,101 | Burger | July 25, 1939 |
| 2,217,086 | Whitacre | Oct. 8, 1940 |